United States Patent [19]

Henneuse et al.

[11] Patent Number: 5,963,913
[45] Date of Patent: Oct. 5, 1999

[54] SYSTEM AND METHOD FOR SCHEDULING AN EVENT SUBJECT TO THE AVAILABILITY OF REQUESTED PARTICIPANTS

[75] Inventors: Nicolle Henneuse; Pete Billington, both of Santa Clara, Calif.

[73] Assignee: Silicon Graphics, Inc., Mountainview, Calif.

[21] Appl. No.: 08/807,551

[22] Filed: Feb. 28, 1997

[51] Int. Cl.⁶ .................................................. G06F 17/60
[52] U.S. Cl. .................................... 705/9; 395/200.35
[58] Field of Search .................... 705/8, 9; 395/200.35; 707/8, 201

[56] References Cited

U.S. PATENT DOCUMENTS

| | | | |
|---|---|---|---|
| 5,050,077 | 9/1991 | Vincent | 705/8 |
| 5,070,470 | 12/1991 | Scully et al. | 705/8 |
| 5,124,912 | 6/1992 | Hotaling et al. | 705/9 |
| 5,303,145 | 4/1994 | Griffin et al. | 705/9 |
| 5,323,314 | 6/1994 | Baber et al. | 705/9 |
| 5,491,626 | 2/1996 | Williams et al. | 705/9 |
| 5,519,606 | 5/1996 | Frid-Nielsen et al. | 705/9 |
| 5,692,125 | 11/1997 | Schloss et al. | 705/9 |
| 5,774,867 | 6/1998 | Fitzpatrick et al. | 705/8 |

*Primary Examiner*—Eric W. Stamber
*Attorney, Agent, or Firm*—Baker & Botts, L.L.P.

[57] ABSTRACT

A system and method are provided for scheduling an event subject to the availability of requested participants. A server application (16) receives event information submitted by a scheduler using a client application (12) to access an event definition page (50). The event information provides one or more options for scheduling an event and lists a plurality of requested participants. Responsive to receiving the event information, the server application (16) creates an event reply page (60) and an event confirmation page (70). The server application (16) then creates and sends an electronic mail message to each requested participant to provide information about the one or more options and a link to the event reply page (60). The server application (16) also creates and sends a message to the scheduler to provide a link to the event confirmation page (70). The server application (16) then receives reply information submitted by the requested participants using client applications (14) to access the event reply page (60). The server application (16) processes this reply information together with the original event information to generate one or more potential schedules and then updates the event confirmation page (70) based upon the potential schedules. The server application (16) receives an event confirmation submitted by the scheduler using a client application (12) to access the event confirmation page (70), and then create and sends a message to each available participant to provide the schedule for the event.

20 Claims, 5 Drawing Sheets

FIG. 3

The Meeting Maker

NAME:
E.MAIL ADDRESS:
MEETING DESCRIPTION:

MEETING NAME:
EXT:

JAN FEB MAR APR MAY JUN JUL AUG SEP OCT NOV DEC

*Click the check boxes of the days that you are available, then highlight the times during that day that you will be able to meet.*

January 1997

| Monday | Tuesday | Wednesday | Thursday | Friday |
|--------|---------|-----------|----------|--------|
|        |         | 1 ☐ 8:00 am / 9:00 am / 10:00 am | 2 ☐ 8:00 am / 9:00 am / 10:00 am | 3 ☐ 8:00 am / 9:00 am / 10:00 am |
| 6 ☐ 8:00 am / 9:00 am / 10:00 am | 7 ☐ 8:00 am / 9:00 am / 10:00 am | 8 ☐ 8:00 am / 9:00 am / 10:00 am | 9 ☐ 8:00 am / 9:00 am / 10:00 am | 10 ☐ 8:00 am / 9:00 am / 10:00 am |
| 13 ☐ 8:00 am / 9:00 am / 10:00 am | 14 ☐ 8:00 am / 9:00 am / 10:00 am | 15 ☐ 8:00 am / 9:00 am / 10:00 am | 16 ☐ 8:00 am / 9:00 am / 10:00 am | 17 ☐ 8:00 am / 9:00 am / 10:00 am |
| 20 ☐ 8:00 am / 9:00 am / 10:00 am | 21 ☐ 8:00 am / 9:00 am / 10:00 am | 22 ☐ 8:00 am / 9:00 am / 10:00 am | 23 ☐ 8:00 am / 9:00 am / 10:00 am | 24 ☐ 8:00 am / 9:00 am / 10:00 am |
| 27 ☐ 8:00 am / 9:00 am / 10:00 am | 28 ☐ 8:00 am / 9:00 am / 10:00 am | 29 ☐ 8:00 am / 9:00 am / 10:00 am | 30 ☐ 8:00 am / 9:00 am / 10:00 am | 31 ☐ 8:00 am / 9:00 am / 10:00 am |

MEETING PARTICIPANT'S E-MAIL OR GROUP ALIAS
(Separated by a space)

[ SEND IT! ]  [ RESET ]

FIG. 5

"MEETING NAME"

The following people are available at these times. Dates with the most overlap are most likely the best time to schedule a meeting.

*Check the box next to a time to schedule a conference room*

| Monday<br>January 6th | Tuesday<br>January 7th | Wednesday<br>January 8th | Thursday<br>January 9th |
|---|---|---|---|
| ☐<br>10:00am–12:00pm | ☐<br>8:00am–10:00am | ☐<br>12:00pm–1:00pm | ☐<br>12:00pm–4:00pm |
| Name1<br>Name2<br>Name3 | Name2<br>Name3 | Name1<br>Name2<br>Name3 | Name2 |
| ☐<br>3:00pm–5:00pm | ☐<br>3:00pm–4:00pm | ☐<br>4:00pm–5:00pm | |
| Name3 | Name3 | Name1<br>Name2<br>Name3 | |

[ SEND IT! ]  [ RESET ]

SYSTEM AND METHOD FOR SCHEDULING AN EVENT SUBJECT TO THE AVAILABILITY OF REQUESTED PARTICIPANTS

TECHNICAL FIELD OF THE INVENTION

This invention relates in general to the field of electronic systems, and more particularly to a system and method for scheduling an event subject to the availability of requested participants.

BACKGROUND OF THE INVENTION

Calendar and scheduler application software are widely used by users to plan their time. One function provided by some conventional calendar applications is to allow users to have access to the calendars of other users and view information about what other users have planned on certain days. This information pulled from other users can be helpful for scheduling events, such as business meetings, that require the attendance of various participants. One example of such a conventional calendar application is LOTUS ORGANIZER, although there are numerous other applications with similar features. In general, conventional applications rely upon each user to update his calendar regularly in order for group scheduling functions to be effective.

One problem that arises with conventional calendar applications is that information pulled from other user's calendars may not be accurate or up-to-date. Consequently, it can be problematic to use that information as a basis for scheduling events and conflicts may exist that are not reflected by the pulled calendar information. When users fail to update their calendars, events may be scheduled during time periods in which some participants actually have conflicts.

SUMMARY OF THE INVENTION

In accordance with the present invention, a system and method for scheduling an event subject to the availability of requested participants are provided that provide advantages over previously developed calendar and scheduler applications.

According to one aspect of the present invention, a system and method are implemented using a server application. The server application receives event information submitted by a scheduler using a client application to access an event definition page. The event information provides one or more options for scheduling an event and lists a plurality of requested participants. Responsive to receiving the event information, the server application creates an event reply page and an event confirmation page. The server application then creates and sends an electronic mail message to each requested participant to provide information about the one or more options and a link to the event reply page. The server application also creates and sends a message to the scheduler to provide a link to the event confirmation page. The server application then receives reply information submitted by the requested participants using client applications to access the event reply page. The server application processes this reply information together with the original event information to generate one or more potential schedules. Based upon these potential schedules, the server application updates the event confirmation page. The server application then receives an event confirmation submitted by the scheduler using a client application to access the event confirmation page. In response, the server application then creates and sends a message to each available participant to provide the schedule for the event. In one implementation, the event definition page, event reply page and event confirmation page are web pages on an Internet.

A technical advantage of the present invention is that it provides a push technology for scheduling events to ensure that accurate availability information is used to schedule an event.

Another technical advantage of the present invention, is that the server application can process the reply information together with the original scheduling options and automatically compute one or more potential schedules that satisfy both the options and the replies.

A further technical advantage of the present invention is that a scheduler and participants are given access to event definition, reply and confirmation pages that are generated automatically by a server application and set-up as network browseable web pages in accordance with a uniform network protocol, such as http. This provides an ability to permit scheduling of events across domains, networks, boundaries and platforms such that the scheduler and various participants are not required to be using the same or similar platforms and applications.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein:

FIG. 3 is a diagram of one embodiment of an event definition page;

FIG. 5 is a diagram of one embodiment of an event confirmation page.

DETAILED DESCRIPTION OF THE INVENTION

Figure 1:
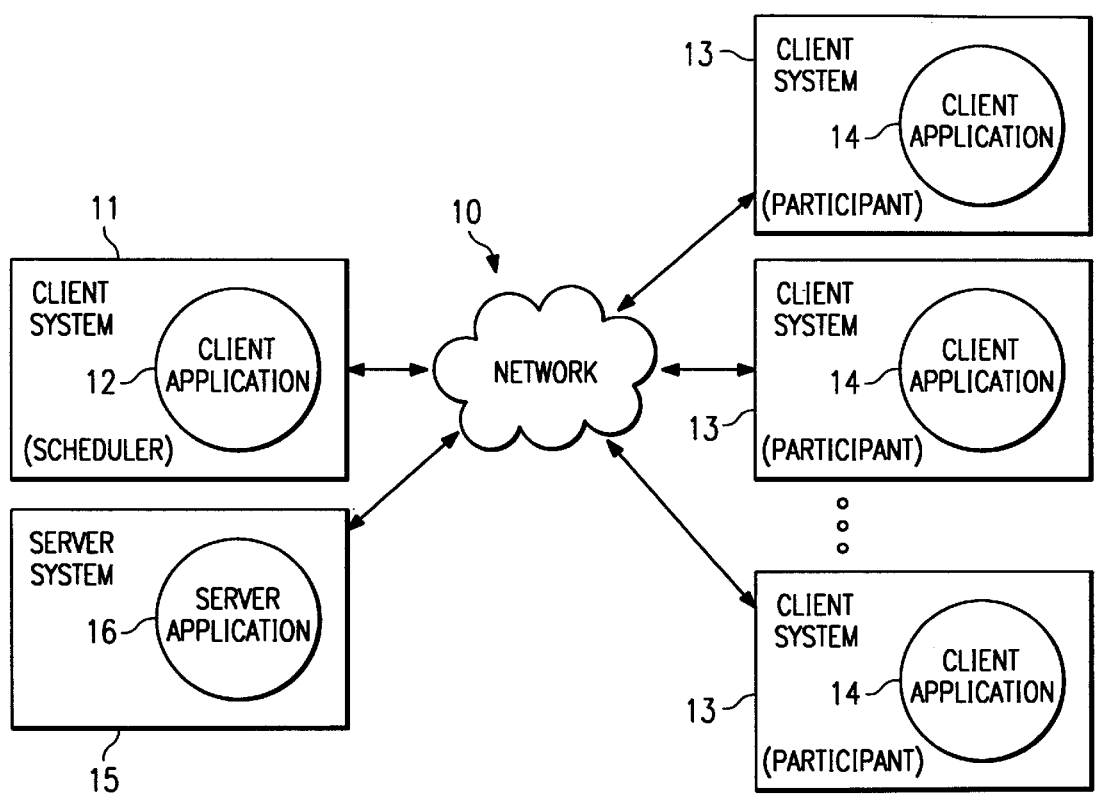
FIG. 1 is a block diagram of one embodiment of a network interconnecting a server system and a plurality client systems.

FIG. 1 is a block diagram of one embodiment of a network, indicated generally at 10, interconnecting a server system and a plurality client systems. In the embodiment of FIG. 1, a client system 11 is connected to network 10 and executes a client application 12. Client system 11 is associated with a user who desires to schedule an event (a scheduler). A plurality of client systems 13 also are connected to network 10 are execute client applications 14. Each client system 13 is associated with a user whose attendance is to be requested at a scheduled event (a participant). A server system 15 is connected to network 10 and executes a server application 16. Network 10 can comprise a local area network (LAN), wide area network (WAN), Internet, the Internet, or other appropriate network for interconnecting and supporting communication between client system 11, client systems 13 and server system 15. Client application 12 and client applications 14 can communicate across network 10 in conformance with a uniform network protocol, such as http, to access network resources on server system 15 or on other network server systems. In one implementation, client application 12 and client applications 14 are web browsers and server application 16 is a web server. In this implementation, server application 16 facilitates the scheduling of an event by providing web pages to client system 11 and client systems 13 and processing information submitted from those web pages. Further, the functions performed by server application 16 can involve one or more server processes and can use network technologies such as java script and applets.

Figure 2:
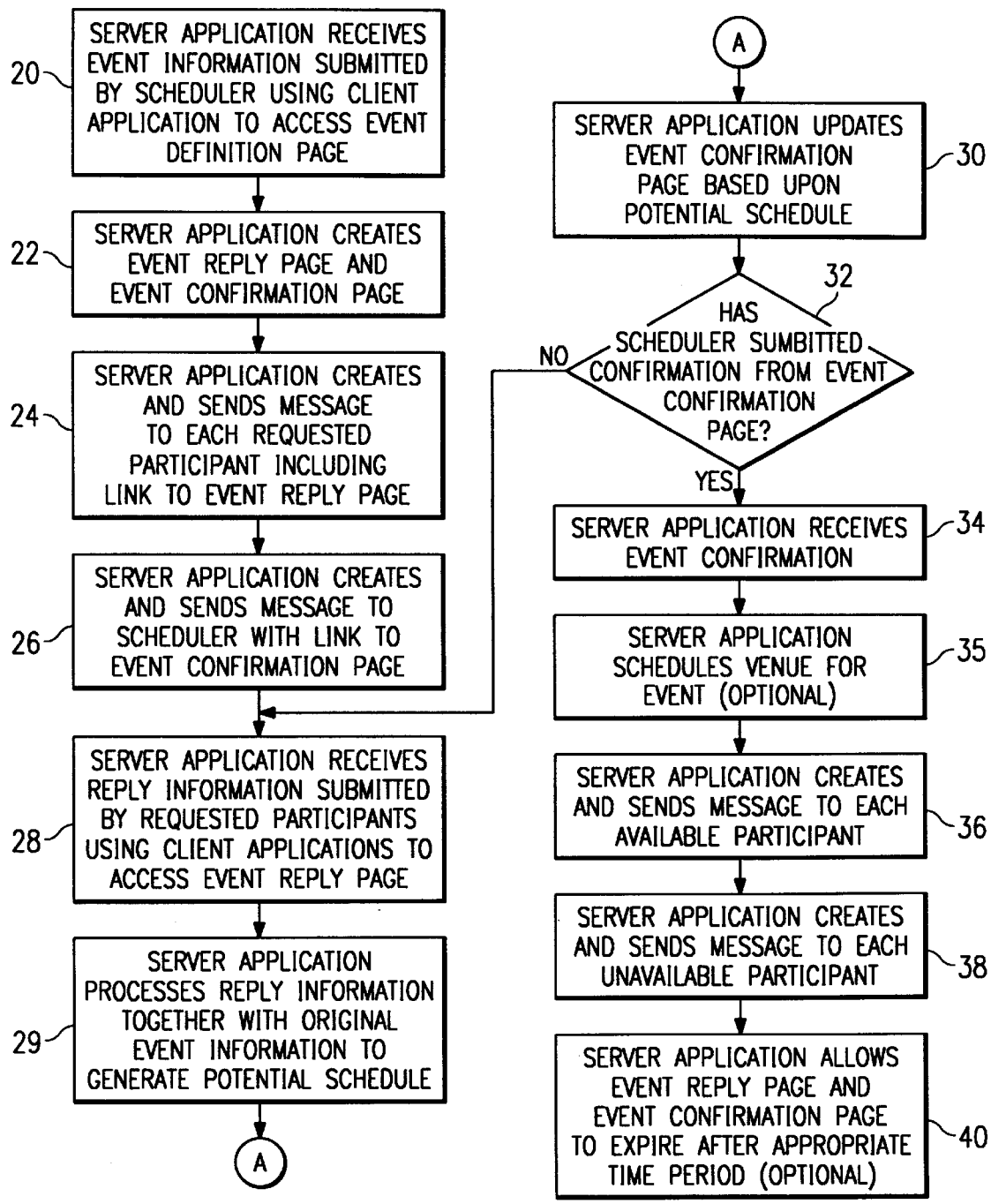
FIG. 2 is a flow chart of one embodiment of a method for scheduling an event subject to the availability of requested participants.

FIG. 2 is a flow chart of one embodiment of a method, implemented using server application 16, for scheduling an event subject to the availability of requested participants. In step 20 of FIG. 2, server application 16 receives event information submitted by a scheduler using client application 12 to access an event definition page. One embodiment of an event definition page is shown in FIG. 3 and described below. The event information received in step 20 includes one or more options for scheduling the event, such as dates and times for the event, and a list of electronic mail addresses requested participants (actual addresses, nicknames, group aliases, etc.). The event information can also include additional information such as an event title, the subject of the event, and information about the scheduler. In one implementation, client application 12 is a web browser, and server application 16 provides the event definition page as a web page on an Internet. In this implementation, the scheduler uses client application 12 to access that web page and to submit event information to server application 16.

Figure 4:
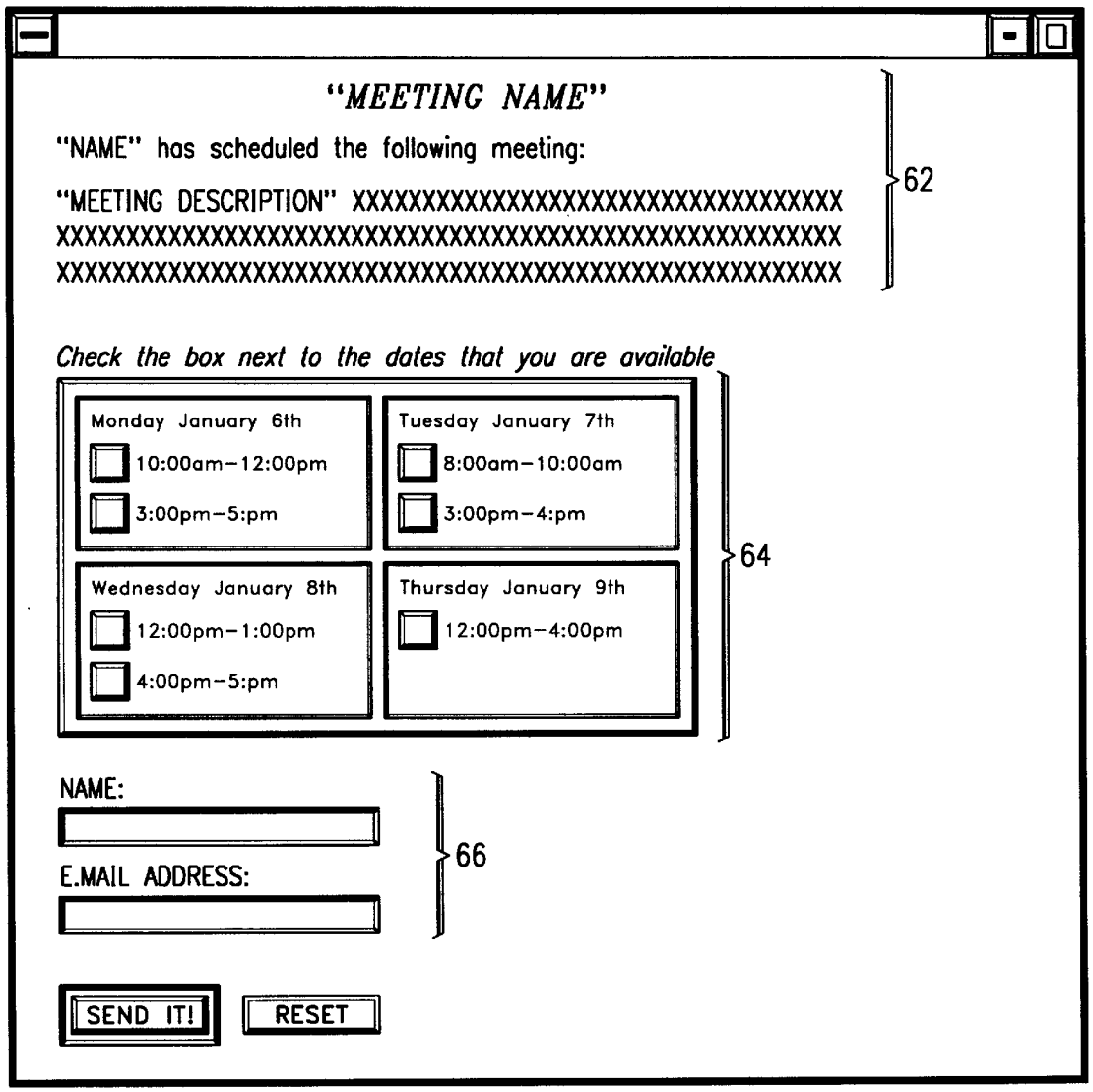
FIG. 4 is a diagram of one embodiment of an event reply page.

In step 22, server application 16 creates an event reply page and an event confirmation page. One embodiment of an event reply page is shown in FIG. 4, and one embodiment of an event confirmation page is shown in FIG. 5. In general, the event reply page includes a display of the one or more options defined by the scheduler as well as other event information defined by the scheduler. On the other hand, the event confirmation page includes a display of one or more potential schedules for the event based upon reply information submitted by the requested participants. Of (course, the event confirmation page does not reflect reply information until it is, in fact, submitted by requested participants. In one embodiment, the server application creates the event confirmation page such that it has restricted access to allow access only to the initiating scheduler. In the Internet implementation, server application 16 provides both the event reply page and the event confirmation page as web pages to which the scheduler and the requested participants have access using respective client applications 12 and 14.

In step 24, server application 16 creates and sends an electronic mail message to each requested participant where each message includes a link to the event reply page. The messages can also include some additional information such as the name of the scheduler and the name of the event to be scheduled. Server application also creates and sends an electronic mail message, in step 26, to the scheduler with a link to the event confirmation page. In one implementation, the links included in the messages are textual http URLs or are web jumpsite icons (described in more detail in U.S. patent application Ser. No. 08/580,742 now U.S. Pat. No. 5,737,560, entitled "Graphical Method and System for Accessing Information on a Communications Network").

After receiving the messages sent by server application 16 on behalf of the scheduler, the requested participants can use the link to the event reply page and client applications 14 to access and view the event reply page. The event reply page allows each requested participant to view the one or more options and respond concerning their availability. This reply information is submitted to server application 16 and reflects during which options the requested participant is available for the event.

In step 28, server application 16 receives the reply information submitted by each requested participant who uses client application 14 to access the event reply page. In step 29, server application 16 processes the reply information together with the original event information to generate one or more potential schedules for the event. Each potential schedule can reflect a time and day for the event along with which requested participants are available. This processing by server application 16 can include matching requested participants to scheduling options as well as evaluating the different scheduling options. In step 30, server application 16 updates the event confirmation page based upon the one or more potential schedules generated in step 29. The updated event confirmation page includes a combination of all of the reply information to provide a summary of which participants are available at which options. The event confirmation page could also reflect a qualitative assessment of the potential schedules.

The scheduler is then able to use client application 12 to access and view the potential schedules provided by the event confirmation page. When all requested participants have replied or when the scheduler otherwise decides to do so, the scheduler can submit a confirmation to server application 16 from the event confirmation page. The event confirmation includes a selection by the scheduler of an option for scheduling the event based upon which participants are available. In step 32, server application 16 determines whether the scheduler has submitted an event confirmation. If not, server application 16 continues to receive reply information and update the event confirmation page.

After an event confirmation is submitted, then in step 34, server application 16 receives the event confirmation. In step 35, which is optional, server application 16 can also enable the scheduler to schedule a venue for the event. This venue scheduling can be an automated process accomplished using a network based conference room scheduling application. Although not shown as a step in FIG. 2, if an appropriate venue is not available, server application 16 can request the scheduler to resubmit a confirmation for the event so that a proper venue can be reserved.

In step 36, after the event confirmation has been received and, optionally, a venue scheduled, server application 16 creates and sends a message to each available participant. This message can inform each available participant of the confirmed schedule for the event and note the indicated availability. In step 38, server application 16 creates and sends a message to each unavailable participant. This message can inform each unavailable participant of the confirmed schedule for the event and the indicated unavailability. Lastly, in step 40, server application 16 optionally allows the event reply page and event confirmation page to expire after an appropriate period of time. Server application 16 then removes these pages so they no longer consume network resources. For example, where the event reply page and event confirmation page are web pages on an intranet, the pages can expire and be removed from storage after the last option for scheduling the event has passed.

FIG. 3 is a diagram of one embodiment of an event definition page, indicated generally at 50. In this embodiment, the event to be scheduled is a business meeting, and the event definition page 50 is a web page on an intranet. It should be understood that access to event definition page 50 also could be provided to client application 12 used by the scheduler through means other than as a web page on an intranet. Event definition page 50 includes a scheduler information area 52 which provides input fields for the scheduler to enter his name, e-mail address, and an extension as well as a meeting name and meeting description. Event definition page 50 also includes an option selection area 54 which allows the scheduler to select one or more options for scheduling the event. In the illustrated embodiment, the event option area 54 includes each day within a month as well as times during each day. Thus, the scheduler is allowed to select one or more days and times as options for scheduling the event. Event definition page 50 further includes a requested participants area 56 which provides an input field for the scheduler to enter the requested participants' e-mail addresses or a group alias. After completing event definition page 50, the scheduler can select the "SEND IT" button to submit event definition information to server application 16. Event definition page 50, as well as the other pages, and the submission functionality can be implemented using appropriate network technologies, such as CGI script, java script or applets.

FIG. 4 is a diagram of one embodiment of an event reply page, indicated generally at 60. In this embodiment, the event to be scheduled is a business meeting, and the event reply page 60 is a web page on an Internet. Event reply page 60 includes a meeting information area 62 which provides the name and description of the event. Event reply page 60 also includes an options area 64 which displays the one or more options selected by the scheduler for scheduling the event. Event reply page 60 further includes a participant information area 66 in which the requested participant can enter his name and electronic mail address. Event reply page 60 allows the requested participant to select the options during which he is available to attend the event. This reply information, along with the participant's name and address, are submitted back to server application 16 when the participant selects the "SEND IT" button. Server application 16 receives and processes the submitted reply information and updates the event confirmation page to provide potential schedules for the event. The result summarizes options consistent with the availability of both the scheduler and the various requested participants.

FIG. 5 is a diagram of one embodiment of an event confirmation page, indicated generally at 70. In this embodiment, the event to be scheduled is a business meeting, and the event confirmation page 70 is a web page on an intranet. Server application 16 updates event confirmation page 70 as it receives reply information from the requested participants. Event confirmation page 70 includes a reply information area 72 that contains potential schedules based upon the processed reply information submitted by the requested participants and the original options submitted by the scheduler. Event confirmation page 70 displays the various scheduling options and the participants who are available for each option. As shown, the name of the participants who are available can appear under each option. The scheduler can then decide which option is best based upon the option with the most overlap or based upon which participants are available. Further, server application 16 can include in event confirmation page 70 a qualitative assessment of the various options suggesting which the scheduler should select. In one embodiment, electronic mail addresses are also included with the names to allow the scheduler to send a message to certain participants.

Once all or a sufficient number of the participants have responded, the scheduler selects a desired option for scheduling the meeting, and selects the "SEND IT" button. Server application 16 receives this confirmation information and creates and sends messages to all available participants providing the name, subject, description and attendance list for the event. Server application 16 can also send messages to the unavailable participants with similar information. Additionally, server application 16 can enable scheduling a conference room or other venue for the event to ensure that there is an appropriate venue at the selected time. In one embodiment, this venue scheduling can be accomplished by interaction with a conference room database that maintains information about conference rooms (e.g., number of people, time, location). The reservation process can be automated and accomplished by :nterfacing to a web-based conference room scheduling application.

Although the present invention has been described in detail, it should be understood that various changes, substitutions and alterations can be made thereto without departing from the spirit and scope of the invention as defined by the appended claims.

What is claimed is:

1. A method for scheduling an event subject to the availability of requested participants implemented by a server application, comprising:

receiving event information submitted by a scheduler using a client application to access an event definition page, the event information providing one or more options for scheduling an event and listing a plurality of requested participants;

creating an event reply page and an event confirmation page responsive to receiving the event information;

creating and sending an electronic mail message to each requested participant, the electronic mail message providing information about the one or more options and a line to the event reply page;

creating and sending a message to the scheduler, the message including a link to the event confirmation page;

receiving reply information submitted by the requested participants using client applications to access the event reply page, the reply information indicating availability of each requested participant for the one or more options;

processing the reply information together with the event information to generate one or more potential schedules, the potential schedules combining availability of requested participants for the one or more options;

updating the event confirmation page based upon the potential schedules;

receiving an event confirmation submitted by the scheduler using a client application to access the event confirmation page, the event confirmation including a schedule for the event; and creating and sending a message to each available participant, the message including the schedule for the event.

2. The method of each claim 1, wherein the one or more options each define a possible date and time for the event.

3. The method of claim 2, wherein the event confirmation information included in the message sent to available participants provides the date and time for the event.

4. The method of claim 1, wherein the event definition page, the event reply page and the event confirmation page are web pages on an intranet.

5. The method of claim 1, wherein the link to the event reply page and the link to the event confirmation page comprise a textual http URL.

6. The method of claim 1, wherein the link to the event reply page and the link to the event confirmation page comprise a web jumpsite icon.

7. The method of claim 1, further comprising automatically scheduling a venue for the event responsive to receiving the event confirmation from the scheduler.

8. The method of claim 7, further comprising requesting the scheduler to resubmit event confirmation information based upon unavailability of an appropriate venue.

9. The method of claim 1, further comprising allowing the event reply page and the event confirmation page to expire after an appropriate time period.

10. The method of claim 9, wherein the event reply page and the event confirmation page expire after the one or more options have passed.

11. The method of claim 1, wherein the event is a business meeting.

12. A system for scheduling an event subject to the availability of requested participants, comprising:
- a network to which a scheduler and requested participants have access and across which the scheduler and the requested participants can communicate information using respective client systems; and
- a server application operable to communicate information across the network, and the server application operable to:
    - receive event information submitted by a scheduler using a client application to access an event definition page, the event information providing one or more options for scheduling an event and listing a plurality of requested participants;
    - create an event reply page and an event confirmation page responsive to receiving the event information;
    - create and send an electronic mail message to each requested participant, the electronic mail message providing information about the one or more options and a link to the event reply page;
    - create and send a message to the scheduler, the message including a link to the event confirmation page;
    - receive reply information submitted by the requested participants using client applications to access the event reply page, the reply information indicating availability of each requested participant for the one or more options;
    - process the reply information together with the event information to generate one or more potential schedules, the potential schedules combining availability of requested participants for the one or more options;
    - update the event confirmation page based upon the potential schedules;
    - receive an event confirmation submitted by the scheduler using a client application to access the event confirmation page, the event confirmation including a schedule for the event; and
    - create and send a message to each available participant, the message including the schedule for the event.

13. The system of claim 12, wherein the event definition page, the event reply page and the event confirmation page are web pages on an intranet.

14. The system of claim 12, wherein the link to the event reply page and the link to the event confirmation page comprise a textual http URL.

15. The system of claim 12, wherein the link to the event reply page and the link to the event confirmation page comprise a web jumpsite icon.

16. The system of claim 12, wherein the server application is further operable to automatically schedule a venue for the event responsive to receiving the event confirmation from the scheduler.

17. The system of claim 16, wherein the server application is further operable to request the scheduler to resubmit event confirmation information based upon unavailability of an appropriate venue.

18. The system of claim 12, wherein the server application is further operable to allow the event reply page and the event confirmation page to expire after an appropriate time period.

19. The system of claim 18, wherein the event reply page and the event confirmation page expire after the one or more options have passed.

20. The system of claim 12, wherein the event is a business meeting.

* * * * *